J. ALLISON.
CAR TRUCK.
APPLICATION FILED FEB. 25, 1910.
987,033.
Patented Mar. 14, 1911.
2 SHEETS—SHEET 2.
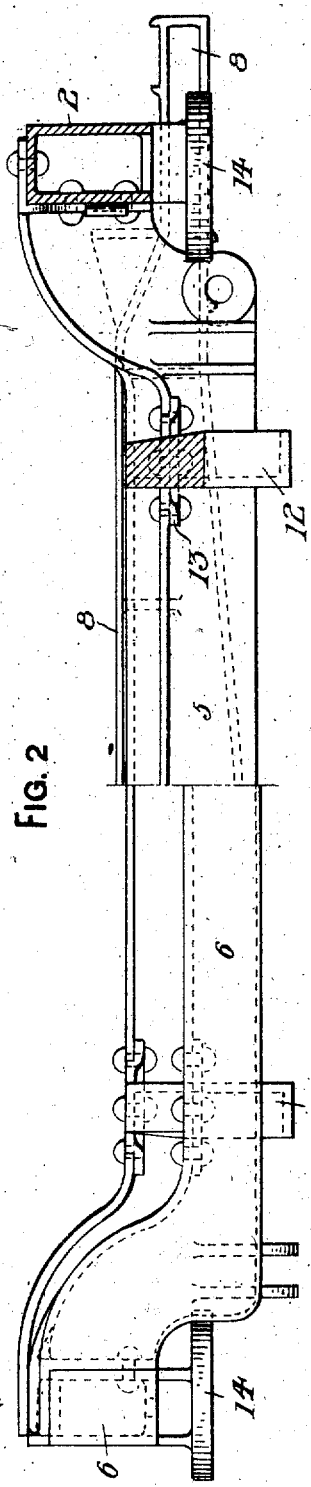
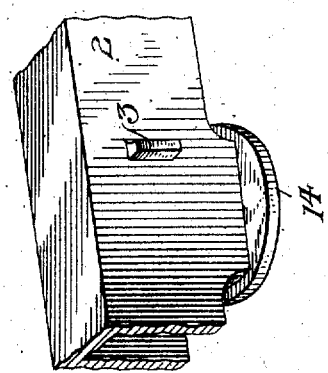
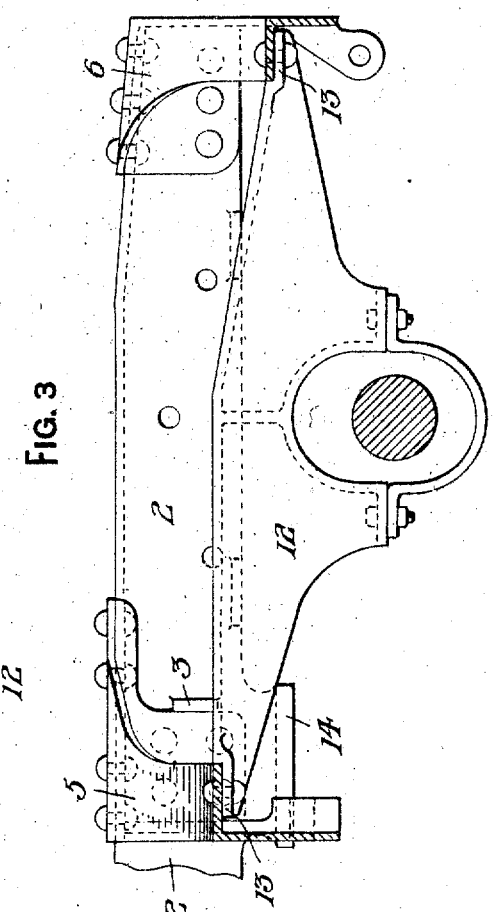
INVENTOR
John Allison
by W. G. Doolittle
Attorney.
WITNESSES

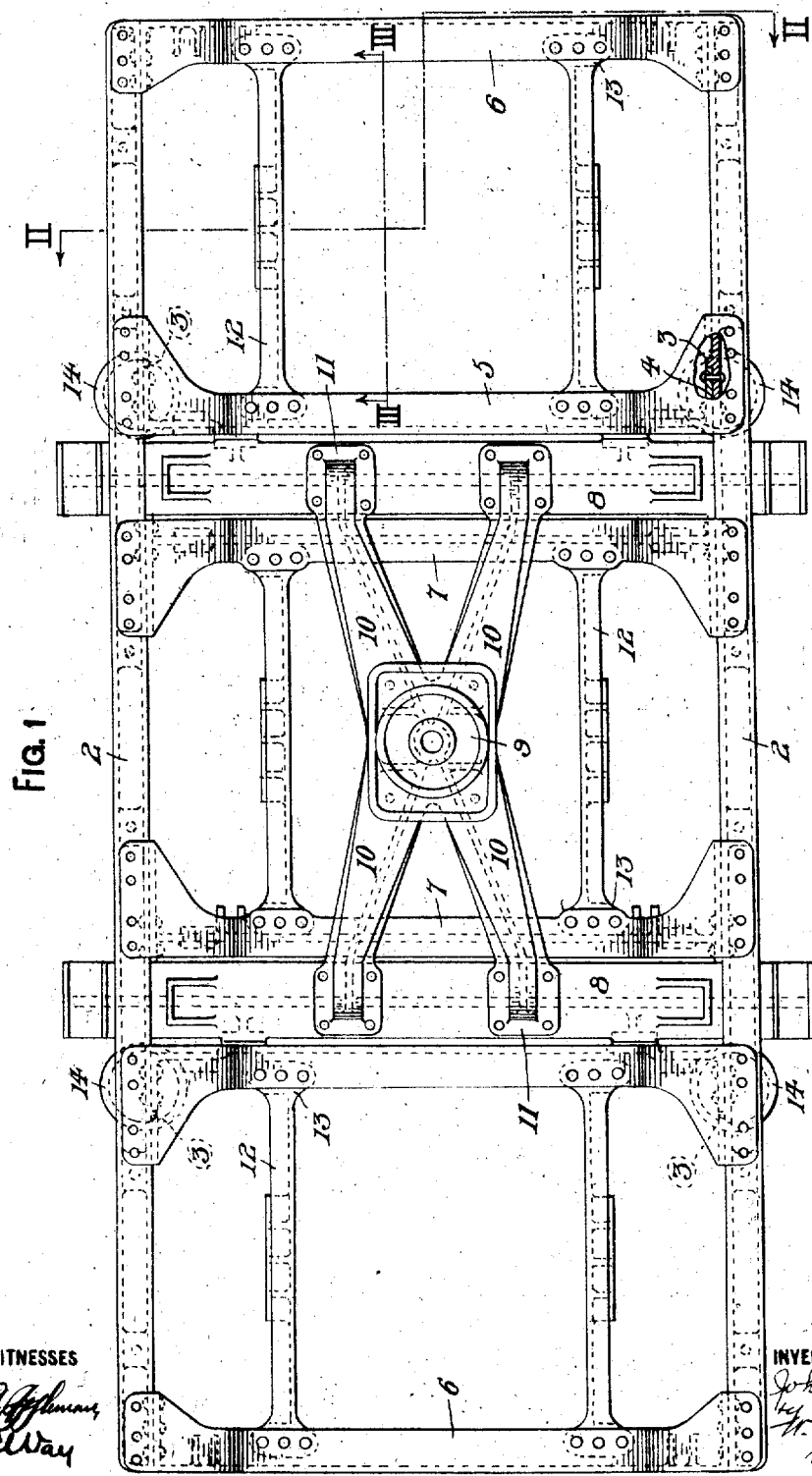

UNITED STATES PATENT OFFICE.

JOHN ALLISON, OF DRAVOSBURG, PENNSYLVANIA, ASSIGNOR, BY MESNE ASSIGNMENTS, TO PITTSBURGH EQUIPMENT COMPANY, OF PITTSBURG, PENNSYLVANIA, A CORPORATION OF PENNSYLVANIA.

CAR-TRUCK.

987,033.  Specification of Letters Patent.  Patented Mar. 14, 1911.

Application filed February 25, 1910. Serial No. 545,798.

*To all whom it may concern:*

Be it known that I, JOHN ALLISON, a resident of Dravosburg, in the county of Allegheny and State of Pennsylvania, have invented certain new and useful Improvements in Car-Trucks, of which the following is a specification.

An object of my invention is to provide a new and improved car-truck or truck-frame, particularly designed for passenger cars, preferably composed of cast-metal pieces or members of novel form and construction, disposed and joined together to provide a strong and durable car truck frame.

In the accompanying drawings, which illustrate an application of my invention, Figure 1 is a top plan of a truck-frame embodying my invention; Fig. 2 a part end view and a part sectional view, the section being taken on line II—II of Fig. 1; Fig. 3, a part elevational view and a part sectional view taken on line III—III of Fig. 1; and Fig. 4, a perspective view of a portion of one of the wheel-pieces.

Referring to the drawings, 2 designate the wheel-pieces of the truck. These pieces as illustrated and as preferred each comprises an integral cast-metal piece of inverted U-shape in cross section, with each piece formed on its inner face with lugs or bosses 3 designed respectively to engage a depending flange 4 of the transoms 5. Transoms 5 are secured to the wheel pieces 2 by rivets as is usual and as clearly shown by the drawings, but by the provision of the lugs 3 on the wheel pieces I am enabled to relieve the securing rivets of considerable strain and thereby provide a much stronger connection between said transoms and wheel-pieces than has heretofore been the case. The ends of members 2 are connected by truck-frame end-members 6 and are intermediately connected by inner transoms 7. Transom 7 and transom 5 of each pair are spaced apart throughout their entire lengths.

8 designate the bolster members of the truck bolster and 9 the truck center-plate. A characteristic feature of the present invention is the manner of and means for supporting the center-plate. As illustrated I provide a casting comprising two diagonal and intersecting members 10 with each member 10 provided at its ends with a plate-member 11 adapted to be secured to the respective bolster-members 8.

In addition to the parts mentioned, I provide axle safety beam members 12 having flat engaging members 13 designed to interlock with or engage the cross-members or transoms of the truck-frame to which they are secured by rivets as particularly shown in Fig. 3.

All of the parts, pieces or members entering into the formation of my truck are of such a nature that they can be made of cast-metal, preferably cast-steel, and a number of the parts are duplicates. The parts may be easily assembled and readily secured together by rivets or other means and when so assembled and secured they produce a strong, durable, and efficient truck fully answering service requirements.

The truck illustrated is a six-wheeled truck designed for passenger cars and provided with equalizing-bar spring caps 14, and other well known elements employed in the construction of car trucks of this class.

What I claim is:

1. In a car-truck frame construction, the combination with wheel-pieces formed with engaging lugs on the inner face thereof, of separable end-pieces extending from one wheel-piece to the other and joining the ends thereof, two pairs of separable transoms connecting the wheel-pieces, a transom of each pair having a flange disposed in contact with the inner face of a wheel-piece and abutting against a lug thereof, and a bolster-member located between each pair of transoms.

2. In a car-truck frame construction, the combination with wheel-pieces each having lugs formed integral with the inner face thereof, of separable end-pieces extending from one wheel-piece to the other and joining the ends thereof, two pairs of separable transoms connecting the wheel-pieces, a transom of each pair having a flange disposed in contact with the inner face of the wheel-piece and abutting against a lug thereof, a bolster member located between each pair of transoms, a truck center-plate, and a casting comprising two diagonal members crossing each other under the center-plate and connecting the bolster members.

3. In a car-truck frame construction, the combination with wheel-pieces each formed with lugs on the inner face thereof, of separable end-pieces extending from one wheel-piece to the other and joining the ends thereof, two pairs of separable transoms connecting the wheel-pieces, a transom of each pair having a flange disposed in contact with the inner face of the wheel-piece and abutting against a lug thereof, a bolster member located between each pair of transoms, separable safety beam members, a truck center-plate, and a casting comprising two diagonal members crossing each other under the center-plate and connecting the bolster members.

4. In a car-truck frame construction, the combination with wheel-pieces, of separable end-pieces extending from one wheel-piece to the other and joining the ends thereof, two pairs of separable transoms connecting the wheel-pieces, the members of each pair being spaced apart throughout their lengths, a bolster member located between each pair of transoms, a truck center-plate, a casting comprising two diagonal members crossing each other under the center plate, separable safety beam members joining the end-pieces and the outer transoms, and separable safety beam members joining the inner transoms.

In testimony whereof I affix my signature in presence of two witnesses.

JOHN ALLISON.

Witnesses:
A. C. WAY,
W. G. DOOLITTLE.